United States Patent [19]

Panella

[11] Patent Number: 5,071,170

[45] Date of Patent: Dec. 10, 1991

[54] CONNECTORS FOR PLUMBING LINES

[76] Inventor: Paul Panella, Rte. 1 - Box 72A, Accident, Md. 21520

[21] Appl. No.: 618,474

[22] Filed: Nov. 27, 1990

[51] Int. Cl.$^5$ .............................................. F16L 17/035
[52] U.S. Cl. .................................. 285/110; 285/345; 285/381; 285/423; 285/906
[58] Field of Search .............. 285/110, 345, 381, 423, 285/150, 906

[56] References Cited

U.S. PATENT DOCUMENTS 4,913,473  4/1990  Bonnema .......................... 285/423

FOREIGN PATENT DOCUMENTS 553801   1/1960  Belgium ............................. 285/110
1207151  2/1960  France .............................. 285/110
1387254  12/1964 France .............................. 285/110

Primary Examiner—Dave W. Arola
Attorney, Agent, or Firm—William F. Frank

[57] ABSTRACT

The present invention comprises couplings which require no adhesives or cold welding or similar techniques for joining lengths of pipe of any known composition. The couplings, in their various shapes, are molded from Ultra high Molecular Weight Polyethylene (UHMWP). Within each end of each coupling form there are a plurality of spaced apart inwardly extending flexible rings, each ring terminating in an angular tip portion which is deformed in the direction of the inserted pipe end and forms a plurality of locking annular seals around the inserted pipe end portion, UHMWP has an inherent self-lubricity which facilitates the insertion of the pipe end portion. UHMWP is chemically inert.

2 Claims, 1 Drawing Sheet

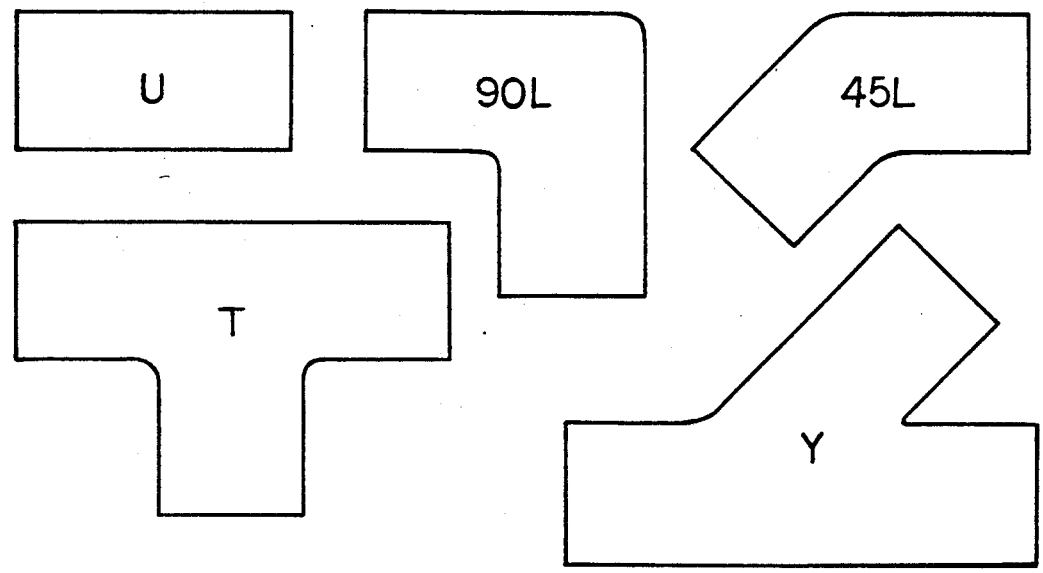
FIG. I
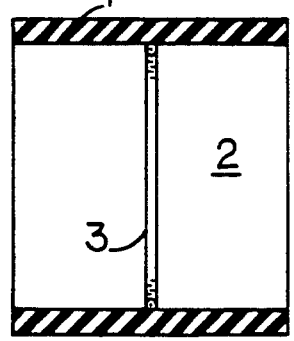
FIG. 2
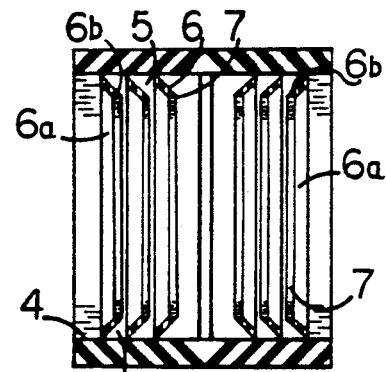
FIG. 3
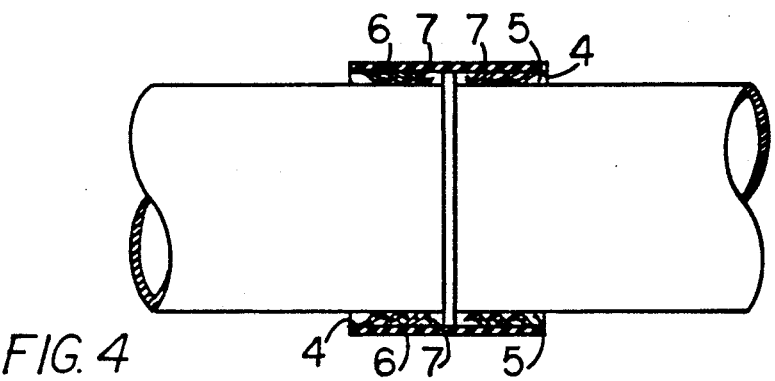
FIG. 4

CONNECTORS FOR PLUMBING LINES

FIELD OF INVENTION

The present invention is in the general field of plumbing. More specifically, the invention presents couplings of the various configurations required by alignment and joinings with improved sealing and ease of installation.

BACKGROUND OF THE INVENTION

Plumbing lines are used generally to encompass the supply of necessary liquids to buildings for various purposes and the removal of liquids from buildings and from surrounding areas. Such lines include water supply and the removal of wastes from the buildings as well as waste water from surface run-off. For example, water for building sites is generally supplied by cast iron mains, each section having a familiar "bell shape" on one end into which is inserted the cylindrical end of the adjacent pipe length. This juncture is usually sealed with the use of oakum pounded into the joint which is otherwise unsecured. In time, the pressure of water passing through the line can lead to leaks which, in turn, requires excavation at the leaking joint and repair. Water is supplied to individual structures from the main line by insertion of a T-connector emplaced in the line, the connector usually being of cast iron sealed within the line by usual systems of oakum. The outlet from the T-connector is obviously of a smaller diameter, commensurate in size to provide the required volume of water to the structure. At this point current practice is to use PVC pipe to the structure. Current practice is to use PVC couplings to adhesively connect the pipe lengths to bring the water to the structure. From this point on, piping for delivery of water within the structure may depend upon the size of the structure. Within houses use of copper lines and fittings is most common. In commercial buildings PVC or copper is used depending upon the volume of water involved, i.e., greater volume in high rise buildings dictating PVC because copper piping is generally restricted to diameters of one inch or less and is used in houses, the copper piping is accordingly appropriately coupled by the well known "cold welding" techniques.

Disposal of wastes from structures presents a different problem in the selection of material for the waste lines due to the more corrosive nature of the waste liquids. Such waste liquids usually contain solids which dictates the use of pipes of 3-4 inch diameter and upwards. Because of weight and lack of resistance to corrosion cast iron disposal lines are no longer used. Other than for large diameter major disposal lines concrete supply pipes are rejected because of weight and difficulty in making sufficiently sealed joints. PVC pipe in diameters up to at least 8 inches are now available together with appropriate couplings. At the present time, pipes and couplings are joined by use of adhesives. In large diameter pipes application of adequate amounts of adhesives is time consuming and labor intensive. The corrosive character of waste liquids has been known to react with the adhesives over a period of time which can result in loss of seal integrity.

SUMMARY OF THE PRESENT INVENTION

The present invention comprises couplings which require no adhesives or cold welding or similar techniques for joining lengths of pipe of any known composition. The couplings, in their various shapes, are molded from Ultra High Molecular Weight Polyethylene (UHMWP). Within each end of each coupling form there are a plurality of spaced apart inwardly extending flexible rings, each ring terminating in an angular tip portion which is deformed in the direction of the inserted pipe end and forms a plurality of locking annular seals around the inserted pipe end portion. UHMWP has an inherent self-lubricity which facilitates the insertion of the pipe end portion. UHMWP is chemically inert. Prior use of UHMWP is disclosed in my co-pending application Ser. No. 07/301,893.

BRIEF DESCRIPTION OF THE DRAWINGS OF THE INVENTION

The accompanying drawings are illustrative of the present invention. In the interest of brevity and to avoid needless repetition which will be clearly evident to any knowledgeable reader, the number of drawing figures has been minimized since the principles of the present invention will be clearly seen.

FIG. 1 is a plan view of the various forms of the couplings to which the present invention is applicable.

FIG. 2 is a cross-sectional view of one of the couplings of the present art along plane 2—2 in FIG. 1.

FIG. 3 is a cross-sectional view of the coupling seen in FIG. 2 disclosing the present invention.

FIG. 4 is a partial cross-sectional view of FIG. 3 with a plumbing pipe inserted therein.

DETAILED DESCRIPTION OF THE INVENTION

FIG. 1 discloses the conventional members used to join lengths of plumbing pipe, i.e., a union coupling, a Y-coupling, an elbow coupling and a T-coupling, all being cylindrical, particularly in the ends where pipes are inserted.

FIG. 2 is a cross-sectional view of the union coupling seen in FIG. 1. The union coupling was selected because it is the most simplistic coupling to illustrate the present invention. The coupling consists of the outer surface 1, an inner surface 2 and an interior circular inwardly extending rib 3 which forms a limit to the extent to which opposing ends of pipes may be inserted. The remaining couplings shown in FIG. 1 do not have such a rib because the angular form inherently limits the insertion of a pipe beyond a evident juncture.

In FIG. 3, each end of the coupling has an inner surface 4 carrying a plurality of annular grooves 5 and a plurality of annular inwardly and upwardly extending flexible ridges or rings 6, each ridge or ring terminating in a flexible tip 7. It is to be noted that the upper surface 6a of each ridge or ring 6 is of the same length as the lower surface 6b resulting in the flexible tip 7 being inwardly and upwardly inclined at a 45° angle relative to lower surface 6b. It is to be further noted that surfaces 6a and 6b are parallel. The inner diameter of the ridges or rings 6 is less than the outer diameter of the pipe to be inserted. This increases the flexibility of ridges or rings so that they are curved upwardly when a pipe is inserted into the coupling. Any attempt to displace a pipe from within a coupling causes the rings and flexible tips to bear more strongly against the outer surface of pipe P thus increasing the sealing and securing of the pipe P within the coupling.

The couplings of the present invention eliminate any use of gaskets or adhesives with pipes of any composition thus providing not only quicker installation but less expense in labor and material costs as well as an improved sealing by the plurality of rings.

What is claimed is:

1. A device of thermoplastic material to encompass and permanently enclose and seal open ends of opposing lengths of pipe in plumbing installations comprising: a one-piece coupling having cylindrical end portions and a center section intermediate said end portions having an interior surface with a diameter at each respective end slightly greater than said pipe exterior diameter, each end portion interior surface carrying a plurality of spaced grooves and ridges forming rings extending from said interior surface of said end portions radially and axially toward said center section said grooves and ridges being parallel, each said ridge having parallel surfaces extending from said interior surface of equal length which terminate in a tip having a flat surface parallel to said interior surface, said tip having flexibility to securely and frictionally engage said pipe outer surface with which said ring is in contact.

2. The device according to claim 1, wherein said coupling is made of a polymer having an inherent lubricity, which is chemically inert, is stable at temperatures from ambient to cryogenic and is resistant to fracture by physical force.

* * * * *